United States Patent Office 2,829,100
Patented Apr. 1, 1958

2,829,100

PROCESS FOR THE PREPARATION OF GREASES GELLED WITH POLYMER COATED CLAYS

Jack W. Armstrong and Donald M. Preiss, Concord, and John A. Edgar, Martinez, Calif., assignors to Shell Development Company, New York, N. Y., a corporation of Delaware No Drawing. Application December 12, 1955
Serial No. 552,271

5 Claims. (Cl. 252—28)

This invention relates to an improved process for the preparation of clay grease compositions, and more particularly pertains to an improved method for the separation of clay from its aqueous medium in which it is originally dispersed.

A copending application, filed in the names of two of the applicants herein, teaches the manufacture of greases gelled with inorganic colloids, the surfaces of which latter are provided with a coating of a thermosetting aldehydic resin. This copending application discloses the use of both aminoplasts (e. g. urea-formaldehyde) and phenoplasts (e. g. phenol-formaldehyde) for this particular purpose. More specifically, this application is especially directed to the production of greases useful at extremely high operating temperatures, in the order of about 450° F., by gelling silicone fluids with inorganic colloids coated in the above manner, and preferably with clays coated with the thermosetting resin.

The above application mentions several methods for the preparation of such greases. The main problem involved comprises the establishment of a highly expanded form of the colloid and maintaining this form until the grease structure is formed. This can be done by the well-known "aerogel process," wherein the colloid is dispersed in a swelling medium such as water, the water replaced with a volatile organic water-miscible solvent and the resulting organogel heated in an autoclave to a temperature above the critical temperature of the solvent at which time the latter is removed by flashing. Of course, this is an expensive process which it would be desirable to avoid. An alternative process involves solvent displacement; in this the hydrogel of the inorganic colloid is treated with a water-miscible organic solvent, such as an alcohol or an acetone to displace the water, after which the polymer-forming monomers and the oil are added. Subsequently, the volatile solvent is removed by evaporation and the remaining ingredients are heated to polymerize and cure the thermosetting resin.

One of the main difficulties in the use of either of these processes resides in the poor filterability characteristics of a hydrogel such as is formed by dispersion of a high base exchange clay or the like in water. In order to avoid the use of unduly large amounts of displacement organic solvents it was the previous practice to filter the clay hydrogel whereby a substantial proportion of the water was separated, leaving a hydrogel of greater concentration of clay. However, this proceeded rather difficultly and required extended periods of filtration time. Consequently, for a given throughput, any plant handling such a process required an extensive capital outlay.

Of course, the improvement would not be contemplated to be restricted to grease compositions in which the final product contained a thermosetting resin coating on the colloidal gelling agent. On the contrary, the broader aspect of such an improvement would comprise the improved filterability of the clay hydrogel, regardless of what the final grease composition was comprised.

It is an object of the present invention to improve the process for the preparation of clay greases. It is another object of the invention to improve the filterability characteristics of clay hydrogels. It is a further object of this invention to improve the process for the preparation of greases gelled with clays coated with aminoplast resins. Other objects will become apparent during the following description.

Now, in accordance with the present invention, it has been found that the following steps comprise an improved process for the preparation of clay greases by substantially improving the filterability of the clay hydrogel when it is desired to subsequently form an aminoplast resin in the grease composition. The present invention combines a step of improving the filterability of the clay hydrogel in conjunction with the later formation of an aminoplast resin in the grease system. The steps in the process are as follows: A clay is dispersed in water to form a fluid clay hydrogel. To this is added between about 5% and about 200% based on the dry weight of the clay of an amino compound capable of taking part in a polymerization upon addition of a second copolymerizing ingredient. The addition of this resin-forming amino compound causes an unexpected improvement in the filterability of the clay hydrogel which is then filtered or centrifuged (mechanically separated) from the majority of the water originally present. The modified and concentrated clay hydrogel is then combined with a water-miscible organic solvent for the purpose of displacing water to form an organosol of the clay. The resulting substantially anhydrous organosol (organogel) is then combined with a lubricating oil and the more volatile organic solvent is removed by evaporation. By this means a clay grease modified by the presence of the amino compound is readily formed.

In its more preferred aspects, of course, the present process is modified by the further addition of resin-forming ingredients and a heating (curing) step in which the resin-forming ingredients combine with the amino compound to form an aminoplast resin on the surface of the clay particles. This may be done at any time subsequent to the removal of water from the system and may be before or after the elimination of the non-lubricating, relatively volatile organic solvent from the clay. More specifically, the invention comprises the addition of a polymerizable amino compound to the clay hydrogel, filtering the latter and displacing the remaining water from the concentrated gel with a lower alcohol or a ketone, after which an aldehyde (such as formaldehyde) is added together with an oil. Subsequent heating causes the formation of an aminoplast resin on the surface of the clay particles, the resulting grease composition being highly resistant to thermal decomposition, oxidation and disintegration in the presence of water.

Still more particularly, extreme high temperature greases can be produced by this process by using as the lubricating oil an organo silicone fluid such as a dimethyl silicone, a cholorphenyl silicone or a methyl phenyl silicone polymer or mixtures thereof.

The addition of the polymerizable amino compound results in a concentrated hydrogel which filters much more readily from the balance of the water than if the amino compound is omitted. The presence of the specified ratio of amino compound causes a marked reduction in the requirements formerly necessary for disposing of the major amount of water originally present in the clay hydrogel.

The aminoplast-forming amino compounds fall into several well-defined categories, only a few of which in each category are of any substantial economic importance. One class comprises amino compounds containing at least 2 amino groups per molecule, each group being attached to a carbon atom bearing a double bond. This group includes such commercially feasible materials as urea, thiourea, guanidine, melamine and dicyandiamide.

A second group comprises organic compounds containing a single amino radical, exemplified by aniline and the alkyl derivatives thereof. This group is referred to generally as aryl primary amines. Alkyl ureas, wherein one of the amino groups contains an alkyl radical substituted for one of the hydrogen atoms, are capable of forming aminoplast resins with aldehydes. Typical of this group are methyl, ethyl or propyl urea and the corresponding alkyl thioureas, as well as the corresponding alkyl guanidine compounds. Finally, the aryl sulfonamides are useful for the preparation of aminoplast resins such as benzene sulfonamide, toluene sulfonamide and other alkaryl sulfonamides. It will be noted that in all of these groups at least one of the amino radicals it attached to an unsaturated atom, either sulfur or carbon.

While it is not essential, it is preferred practice to add a minor amount (1–15% based on the dry weight of the clay) of a strong mineral acid to the clay hydrogel prior to incorporation of the resin-forming ingredients. The acid apparently "activates" the clay in some manner so that it exhibits greater gel-forming capacity. While phosphoric acid is preferred, other mineral acids such as hydrochloric or sulfuric may be employed.

The polymerizable amino compound may be added without dilution, in the form of a concentrated water solution, or as an organic solvent solution, the organic solvent preferably being one which is miscible with water. While the proportion of amino compound may be varied between about 5 and about 200% based on the weight of the dry clay, it is preferred that the proportion be within the more restricted range of from about 10 to about 90%.

In the process according to the invention, clay is dispersed in water for two principal purposes: First, to separate the non-colloidal contaminants generally referred to as "gangue," and secondly, to swell the colloidal clay particles to their maximum extent so as to enable them to perform their function as a gelling agent for the greases to be eventually made therefrom.

In order to keep the clay hydrogel in workable (fluid) concentration, it is preferred that the clay be dispersed to yield a hydrogel containing between about 0.25% and about 3% by weight of dry clay, based on the hydrogel before mechanical separation of water therefrom. This percentage is based upon dry weight of de-gangued clay and not upon the dry weight of clay containing naturally occurring contaminants. While the clay is largely dispersed throughout the entire body of the water in which it is incorporated, it is in the form of jelly-like colloidal globules which can be isolated by mechanical separation from a large part of the water to yield a clay hydrogel of substantially increased clay content without shrinking the expanded colloidal structure of the clay. By "mechanical separation" is meant any process for the separation of water from the colloid which does not involve a change in physical state such as occurs in normal evaporation methods and the like. Consequently, mechanical separation normally includes filtration techniques and accelerated substitutes therefor, such as centrifuging. This mechanical separation is performed subsequent to the addition to the clay hydrogel of the above-described aminoplast-forming amino compounds. The mechanical separation can take place at any desired temperature, room temperature being that preferably employed, although any temperature up to that of the boiling point of water may be utilized.

Following the mechanical separation of a large proportion of water from the hydrogel, the concentrated gel is extracted with a water-soluble relatively low boiling organic solvent so as to displace substantially all of the water remaining therein. The organic solvent may be any of those well known to the art, such as water-soluble alcohols or ketones, including methanol, ethanol, iso- propyl alcohol, acetone, or methyl ethyl ketone. Corresponding water-miscible low molecular weight esters (including aliphatic esters of fatty acids and fatty alcohols such as ethyl acetate) may be employed and mixtures of water-soluble organic solvents may be utilized. The organogel resulting from this water displacement procedure normally contains between about 2% and about 80% by weight of dry clay. It is preferred that the aminoplast-forming aldehyde be added to this organosol together with the lubricating oil which will eventually form the oil phase of the grease composition.

The proportion of aldehyde to be added will depend in large part upon the identity of the aminoplast-forming amino compound previously incorporated prior to mechanical separation of water. For example, if urea-formaldehyde resins are to be formed, formaldehyde is added to the described mixture in a proportion of between about 1.5 to about 4 moles for each mole of the urea already present. Preferred aniline-formaldehyde resins are formed with molar ratios of 1:1.2–1.5. On the other hand, if a melamine-formaldehyde resin is to be utilized, formaldehyde will be added in a proportion of between about 2 and about 6 moles for each mole of melamine previously incorporated. The conditions for polymerization are well known in the art and do not form a part of the present invention. For example, when forming a urea-formaldehyde resin, it is preferred that the pH in the system be adjusted to 5.5–8 and a curing temperature of between about 100 and about 250° C. be utilized. In the case of melamine-formaldehyde resins, the optimum pH range is between 7.5–9.5 with a curing temperature range of between about 100 and about 250° C.

The aldehydes which may be utilized together with the classes of amino compounds described hereinbefore for the forming of aminoplast resins include either saturated or unsaturated aliphatic aldehydes or cyclic derivatives thereof, including formaldehyde, acrolein, furfural, crotonaldehyde and acetaldehyde.

Following addition of the aldehyde and lubricating oil, the mixture is heated to a temperature at which the organic water displacement solvent is removed by evaporation or distillation. The grease-forming ingredients remaining are heated at a temperature sufficient to polymerize and cure the resin coating the clay particles, thus creating a grease structure having a high resistance to disintegration by water and the like.

The clays utilized in the subject class of greases are especially preferred for use in high temperature grease compositions due to their relatively inert character at these high operating temperatures. While clays of low base exchange capacity, such as Georgia clay, Attapulgite and the like, may be utilized, it is preferred that a high base exchange clay, such as Wyoming bentonite or Hectorite, be employed.

While the present invention is especially directed to extreme high temperature lubricating greases, they may be employed for normal operating conditions as well. Hence, and especially useful at these operating conditions below about 400° F., any of the well-known lubricating oils may be utilized. These include mineral oil lubricants and synthetic lubricating oils of known types, such as the phosphorus esters, silicon esters and aliphatic esters formed by esterification of aliphatic dicarboxylic acids with monohydric alcohols. Typical species of these materials include tricresyl phosphate, dioctyl phthalate, bis(2-ethylhexyl)silicate and the like.

Lubricants to be employed at temperatures in excess of about 400° F. are those having an inherent high thermal stability including the halocarbons and organo-silicone fluids. The halocarbons may be those described in Peterson et al. patent—U. S. 2,679,479, and include especially the fluorocarbon oils, preferably distilling above about 200° C. at atmospheric pressure. The most useful class of lubricants for grease compositions to be utilized at temperatures in excess of about 400° F. include the organo-substituted silicone fluids of lubricating oil viscosity. Liquid organo-silicone polymers which are adapted for the preparation of the subject high temperature grease compositions may be obtained by the hydrolysis and chemical condensation of one or more hydrolyzable silicone compounds having the general formula $R_2SiX_2$, wherein R is a lower alkyl radical and X is a hydrolyzable group selected from the class consisting of halogen and alkoxy groups. They may also be obtained by the hydrolysis and chemical condensation of a mixture of alkylated silicone compounds containing at least 75 mol percent of such dialkyl silicone compound having the general formula $R_2SiX_2$ and not more than 25 mol percent of a monoalkyl silicone compound having the formula $RSiX_3$, or a total of not more than 25 mol percent of both such monoalkyl silicone compound and a trialkyl silicone compound having the formula $R_3SiX$. In all of these formulae, R and X have the meanings stated above. In general, the hydrolyzable silicone compound or mixture of such compounds from which the liquid organo-silicone polymers may be prepared is one having an average composition corresponding to the formula $R_{4-z}SiX_z$, wherein z is a whole or a fractional number from 2.25 to 1.5 and R and X have the meanings given above.

Examples of hydrolyzable dialkyl silicone compounds which may be used in preparing the liquid organo-silicone polymers are dimethyl silicone dichloride, methyl ethyl silicone dichloride, diethyl silicone dichloride, methyl propyl silicone dichloride, dimethyl silicone dibromide, diethyl silicone dibromide, dimethyl-dimethoxy-silicone, diethyldiethoxy-silicone, dimethyldiethoxy-silicone, etc. Examples of hydrolyzable monoalkyl silicone compounds and hydrolyzable trialkyl silicone compounds which may be present together with the dialkyl silicone compound in amount not exceeding 25 mol percent of the mixture are methyl silicone trichloride, ethyl silicone tribromide, ethyl silicone trichloride, propyl silicone trichloride, methyl-trimethoxy-silicone, methyl-triethoxy-silicone, ethyl-triethoxy-silicone, trimethyl silicone chloride, trimethyl silicone bromide, triethyl silicone chloride, trimethyl-methoxy-silicone, trimethyl-ethoxy-silicone, triethyl-ethoxy-silicone, etc.

The liquid organo-silicone polymer may be obtained by heating the hydrolyzable silicone compound or compounds with water in the presence of a hydrolysis catalyst, e. g. a mineral acid. Hydrolysis of the silicone compounds to form corresponding organo-silicols (which silicols are unstable under the reaction conditions and in some instances have not been isolated as such) is accompanied by chemical condensation of the silicols to form the liquid organo-silicone polymer (or copolymer) product. The starting materials are selected so that the product contains an average of between 1.75 and 4, and preferably between 1.9 and 2.5, atoms of carbon per atom of silicone.

The viscosity of such polymer or copolymer is, of course, dependent upon the reaction conditions employed in preparing the same, e. g. the polymers of dimethyl silicone vary from thin liquids to viscous liquids to solid resins depending upon the conditions under which they are prepared. It is the liquid polymers and copolymers having a preferred viscosity exceeding 500 Saybolt seconds at 100° F., which are usually employed in preparing the new compositions and such liquid polymers of dimethyl silicone are preferred.

While, in most cases, the resin-forming monomer added before water separation is an amino compound, sources of the aldehyde such as hexamethylene tetramine (or the aldehyde per se) may be added thereto, the second resin-forming ingredient being added either before or after water separation. If added before water separation, the clay organogel, together with the two resin-forming ingredients may be heated (such as by refluxing the water present) for a time sufficient to cause at least partial resinification. This actually causes the formation of a more hydrophobic coating on the colloid surface and aids in speeding up subsequent mechanical separation of water.

The advantages of the present invention are indicated in further detail in the data contained in the following working examples. In general, it has been found that the introduction of the aminoplast-forming amino compound prior to water separation prevents the partial collapse of the clay hydrogel and hence enables the use of a relatively smaller amount of clay to form a grease of a given consistency than if other methods of preparation are utilized. Moreover, the greases so prepared have outstanding mechanical stability, especially when utilized at high operating temperatures for the lubrication of high speed bearings.

EXAMPLE I

*Aniline-formaldehyde*

To 20 parts by weight of Hectorite clay (as a 2% slurry in water) is added 1.4 parts by weight of 85% $H_3PO_4$ followed by 8 parts by weight of aniline. After thorough mixing the aniline coated clay is filtered from the water and washed twice with isopropyl alcohol (either by washing the clay directly on the filter paper or by removing the filter cake, dispersing in alcohol, and filtering again). The washed filter cake is then slurried in alcohol and 4.8–5 parts by weight of paraformaldehyde added. After mixing, 300 parts by weight of DC 550 (Dow Corning dimethyl silicone fluid) is added. The mixture is refluxed for two hours. The alcohol is removed by distillation, and the resulting grease is dried in an oven at 210° F. for 1 day. The grease is then heated to 300° F. and held at this temperature for 2 days. After this "cure" the grease is homogenized.

Properties of finished grease:

Micropen=118 dmm.
Bleeding 3.1% (2 hrs. at 300° F.)
Wheel bearing test (6 hrs. at 660 R. P. M. at 280° F.= pass)
Percent $H_2O$ uptake in hand emulsion test=42%
ABEC bearing test (10,000 R. P. M. at 450° F.)=1019 hrs. to failure.

EXAMPLE II

*Aniline-formaldehyde*

The procedure of Example I is repeated except that 40 parts by weight of aniline is added instead of 8 parts by weight. The clay is saturated with aniline and the excess is removed by alcohol wash. Both procedures produce satisfactory greases, but by using excess aniline the filtration step is faster.

EXAMPLE III

*Aniline-formaldehyde*

To 20 parts by weight of Hectorite clay (as a 2% slurry in water) is added 1.4 parts by weight of 85% $H_3PO_4$ followed by 8 parts by weight of aniline. To this mixture is added 13 ml of 38% formaldehyde solution (formalin). Polymerization is carried out by refluxing for 4 hours. The polymer coated clay is filtered and washed twice with alcohol. The clay is then suspended in alcohol and 300 parts by weight of Dow Corning silicone fluid (DC 550) added. The alcohol is evaporated, and the grease resulting is dried, cured, and homogenized as in Example I.

EXAMPLE IV

*Aniline-melamine-formaldehyde*

The procedure used is essentially the same as in Example I.

The following quantities of ingredients are used:

20 parts by weight of Hectorite clay (as a 2% aqueous suspension)
1.4 parts by weight of 85% $H_3PO_4$
20 parts by weight of aniline
1 part by weight of melamine
1.3 parts by weight of paraformaldehyde
300 parts by weight of DC 550 oil The acidified aniline coated clay is transferred to alcohol. Melamine and paraformaldehyde are added, then add the oil. The mixture refluxes 2 hours, after which alcohol is evaporated. The grease is cured at 300° F. for 2 days.

Properties:

Dropping point—Grease has no dropping point up to at least 560° F.
Cu strip corrosion—Excellent at 212° F.
Thin film test—4 hrs.=3.85%; 24 hrs.=21.6%; rating—fair to good.
Micropen=130 dmm.

EXAMPLE V

*Phenol-formaldehyde*

20 parts by weight of Hectorite clay (as 2% suspension in water
5 parts by weight of hexamethylenetetramine
2 parts by weight of phenol
0.6 part by weight of paraformaldehyde
300 parts by weight of DC 550 oil
1.4 parts by weight of 85% $H_3PO_4$ The polyamine is added to the acidified clay slurry. The clay (coated by the polyamine) is then transferred to alcohol by the same procedure as used in Example I–IV. The phenol, paraformaldehyde and oil are added to the alcohol slurry of the clay. The mixture is refluxed for 2 hours. The alcohol is then removed by distillation. The resulting grease is cured at 300° F. for 2 days and homogenized.

Properties:

Percent water emulsion=75%
Micropen=137 dmm.
Bleeding=2.1%

EXAMPLE VI

*Phenol-formaldehyde*

To 20 parts by weight of Hectorite clay (2% aqueous slurry) which is acidified with 1.4 parts by weight of 85% $H_3PO_4$ is added 5 parts by weight of hexamethylenetetramine. This mixture is heated to reflux and 2 parts by weight of phenol is added. After refluxing for 6 hours the polymer coated clay is filtered, washed twice with alcohol and suspended in alcohol. Dow Corning silicone oil (300 parts by weight) is added. The alcohol is evaporated. The grease is cured at 300° F. for 2 days and homogenized.

EXAMPLE VII

*Aniline-furfural*

20 parts by weight of Hectorite clay (as a 2% aqueous slurry)
1.4 parts by weight of 85% $H_3PO_4$
8 parts by weight of aniline
8 parts by weight of furfural
300 parts by weight of DC 550 silicone oil The acidified clay is treated with aniline. Furfural is added which results in a brilliant red color. This aquagel is refluxed for 2 hours. The polymer coated clay is then transferred to alcohol. Oil is added, the alcohol is evaporated and the grease is cured at 300° F. for 2 days and homogenized.

EXAMPLE VIII

*Melamine-formaldehyde*

The same procedure is used as in Example I except that the mixture is refluxed for 5 hours prior to alcohol evaporation.

Proportions:
18.4 parts by weight of clay (as a 2% aqueous slurry)
1.25 parts by weight of 85% $H_3PO_4$
7.4 parts by weight of melamine
3.6 parts by weight of paraformaldehyde
265 parts by weight of DC 550 oil

EXAMPLE IX

*Benzidine-formaldehyde*

The same procedure is used as in Example I.

Proportions:
18.4 parts by weight of Hectorite clay (2% aqueous slurry)
1.25 parts by weight of 85% $H_3PO_4$
7.4 parts by weight of benzidine
5 parts by weight of paraformaldehyde
300 parts by weight of DC 550 silicone oil DC 550 silicone oil has a viscosity of 300–400 SSU at 100° F., a freezing point of 48° C., a boiling point of about 250° C. and a refractive index of 1.487.

We claim as our invention:

1. In the process for the formation of a grease composition, wherein a clay hydrogel is filtered from the majority of the water present therein, the remaining water is displaced by a water-miscible organic solvent, a grease-forming proportion of an organo-silicone fluid having a lubricating oil viscosity is added and the solvent removed by evaporation, the improvement comprising adding 5–200% by weight based on the clay of an aminoplast-forming monomeric amino compound, having at least 2 primary amino groups per molecule adjacent to carbon atom having a double bond, prior to filtration whereby a clay hydrogen of improved filterability is formed, adding 1.5–4 mols, per mol of amino compound, of an aminoplast-forming aldehyde subsequent to water displacement and heating the mixture, subsequent to solvent removal for 4–48 hours at 100–250° C., whereby a grease composition having improved water resistance is formed.

2. In the process for the formation of a grease composition, wherein a clay hydrogel is filtered from the majority of the water present therein, the remaining water is displaced by a water-miscible organic solvent, a grease-forming proportion of an orgango-silicone fluid having a lubricating oil viscosity is added and the solvent is removed by evaporation, the improvement comprising adding 5–200% by weight based on the clay of an aminoplast-forming arylamine, prior to filtration; adding 1.2–1.5 mols, per mol of arylamine, of an aminoplast-forming aldehyde subsequent to water displacement, and heating the mixture, subsequent to solvent removal for 4–48 hours at 100–250° C., whereby a grease composition having improved water resistance is formed.

3. In the process for the formation of a grease composition, wherein a clay hydrogel is filtered from the majority of the water present therein, the remaining water is displaced by a water-miscible aliphatic ketone, a grease-forming proportion of an organo-silicone fluid having a lubricating oil viscosity is added and the ketone is removed by evaporation, the improvement comprising adding 5–200% by weight based on the clay of an aminoplast-forming amino compound, having at least 2 primary amino groups per molecule adjacent to carbon atom having a double bond, prior to filtration; adding 1.5–4 mols, per mol of amino compound, of an aminoplast-forming aldehyde subsequent to water displacement; and heating the mixture, subsequent to solvent removal for 4–48 hours at 100–250° C., whereby a grease composition having improved water resistance is formed.

4. The process for forming an extreme high temperature grease having improved thermal stability, water resistance and mechanical stability at elevated temperatures comprising forming a dilute clay hydrogel containing 0.5–3% by weight of clay; adding 5% to 200% by weight based on the weight of dry clay, of aniline, whereby a hydrogel of improved filterability is formed, filtering water therefrom to form a concentrated clay hydrogel, displacing the remaining water from the hydrogel with ethyl alcohol, adding thereto 1.2–1.5 mols of formaldehyde per mol of aniline, together with a grease-forming proportion of a dimethyl silicone oil having a lubricating oil viscosity; evaporating the alcohol therefrom and heating the remaining mixture for 4–48 hours at 100–250° C., whereby the clay gel particles are coated with an aniline-formaldehyde resin, said coated clay particles acting as a gelling agent for the oil, whereby a grease composition is formed.

5. In the process for the formation of a grease composition, wherein a clay hydrogel is mechanically separated from the majority of the water present therein, the remaining water is displaced by a water-miscible organic solvent, a grease-forming proportion of a lubricating oil selected from the group consisting of mineral lubricating oil and synthetic lubricating oil miscible with said solvent is added and the solvent is removed by evaporation, whereby a grease composition is formed, the improvement comprising adding to said hydrogel, prior to separation thereof from water, between about 5 and about 200% by weight, based on the dry weight of the clay, of a monomeric aminoplast-forming amino compound and subsequent to water displacement adding from about 1.2 to 6 mols of an aminoplast-forming aldehyde per mol of amino compound and heating the mixture, subsequent to solvent removal for 4–48 hours at 100–250° C., whereby a grease composition having improved water resistance is formed.

References Cited in the file of this patent
UNITED STATES PATENTS

| | | |
|---|---|---|
| 2,623,853 | Stross | Dec. 30, 1952 |
| 2,681,314 | Skinner | June 15, 1954 |